(12) United States Patent
Uschold et al.

(10) Patent No.: US 7,348,377 B2
(45) Date of Patent: Mar. 25, 2008

(54) FLUOROPOLYMER SEALANT

(75) Inventors: Ronald Earl Uschold, West Chester, PA (US); Sina Ebnesajjad, Chadds Ford, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 71 days.

(21) Appl. No.: 11/392,183

(22) Filed: Mar. 29, 2006

(65) Prior Publication Data

US 2006/0167171 A1 Jul. 27, 2006

Related U.S. Application Data

(62) Division of application No. 10/728,565, filed on Dec. 5, 2003, now Pat. No. 7,049,365.

(60) Provisional application No. 60/438,117, filed on Jan. 6, 2003.

(51) Int. Cl.
*C08L 27/12* (2006.01)

(52) U.S. Cl. ............ 524/544; 427/169; 428/421; 428/343; 526/242; 526/254

(58) Field of Classification Search .......... 428/421, 428/343; 427/169; 526/242, 254; 524/544
See application file for complete search history.

(56) References Cited

U.S. PATENT DOCUMENTS

| 3,635,926 | A |   | 1/1972 | Gresham et al. |              |
|-----------|---|---|--------|----------------|--------------|
| 4,380,618 | A |   | 4/1983 | Khan et al.    |              |
| 4,729,296 | A |   | 3/1988 | Sabin          |              |
| 4,865,903 | A | * | 9/1989 | Adiletta       | 428/215      |
| 5,010,130 | A | * | 4/1991 | Chapman et al. | 524/445      |
| 5,266,639 | A |   | 11/1993| Chapman, Jr. et al. |         |
| 5,328,946 | A |   | 7/1994 | Tuminello et al. |            |
| 5,397,829 | A |   | 3/1995 | Morgan et al.  |              |
| 5,658,960 | A | * | 8/1997 | Dolan          | 521/57       |
| 6,016,848 | A | * | 1/2000 | Egres, Jr.     | 138/137      |

FOREIGN PATENT DOCUMENTS

| EP | 0 002 894 A2      | 7/1979   |
|----|-------------------|----------|
| EP | 2894 A2 *         | 7/1979   |
| GB | 1 505 077         | 3/1978   |
| WO | WO-2004/062888 A1 * | 7/2004 |

* cited by examiner

*Primary Examiner*—Peter D. Mulcahy
*Assistant Examiner*—Henry S. Hu

(57) ABSTRACT

A heat sealable tape of a copolymer of tetrafluoroethylene and at least about 15% by weight of a highly fluorinated monomer. The copolymer has a melt viscosity of no greater than about 1000 Pa·S at 372° C. and an application temperature of no greater than about 250° C. The invention further provides for a seam formed from two sections of sheet material, especially fabric, wherein each sheet has at least one fluoropolymer surface. The sections are sealed one to the other by application of heat sealable composition over one fluoropolymer surface of each section. The heat sealable composition comprises a copolymer of tetrafluoroethylene and at least about 15% by weight of a highly fluorinated monomer, the copolymer having a melt viscosity of no greater than about 1000 Pa·S at 372° C. and an application temperature of no greater than about 250° C. In preferred embodiments, building structures and manufacturing equipment are fabricated from sheet material having the seam formed from two sections of sheet material wherein each sheet has at least one fluoropolymer surface.

10 Claims, No Drawings

FLUOROPOLYMER SEALANT

FIELD OF THE INVENTION

This invention relates to a fluoropolymer sealant for seams in fluoropolymer coated sheet material, a seam using the sealant and a method for sealing a seam.

BACKGROUND OF THE INVENTION

Architectural fabrics are finding increasing use in roofing and side panels for public facilities such as airports and sports arenas, and functional decorative elements such as awnings, tents and canopies. These fabrics offer advantages compared to traditional materials because of modern appearance, ease of construction, rapid fabrication and lower cost. Architectural fabrics typically comprise a reinforcing cloth for strength and a polymeric coating to render the cloth weatherproof. The cloth may be made from a variety of materials such as cotton, nylon, polyester, polyolefin or glass, or blends of such fibers. The cloth may be woven as commonly done with cotton, nylon or glass, or it may be non-woven as with fabrics sold under the trademarks TYVEK®, TYPAR® and REEMAY®. The TYVEK® trademark is used by the DuPont Company for flash-spun polyethylene fabrics, and the TYPAR® and REEMAY® trademarks are used by Reemay, Inc. for spunbonded polypropylene and polyester fabrics, respectively. The polymeric coating may comprise any resin resistant to weathering conditions including fluoropolymers, vinyl, acrylics, natural or synthetic rubber. Of these, fluoropolymers are especially preferred because of their extreme resistance to a broad range of weathering conditions. Vinyl coated polyester cloth finds extensive use in awnings and tents because of its low cost. It offers excellent resistance to rain, however, on exposure to sunlight the vinyl deteriorates eventually leading to discoloration and failure of the fabric.

The useful lifetime of a vinyl coated fabric can be markedly extended by laminating a thin overlayer of a fluoropolymer such as polyvinyl fluoride to the weather-side of the vinyl coated fabric. If the fluoropolymer is pigmented or contains an additive that highly absorbs ultraviolet light, sunlight is effectively blocked from the underlying vinyl and its lifetime is greatly extended. Although this extends the usefulness of the fabric, in some cases like sports arenas, it is desired for the lifetime of the fabric to be even longer than can be provided by typical fabric containing vinyl resin. In these applications, extremely durable materials like glass cloth and perfluorinated resins like polytetrafluoroethylene (PTFE) or copolymers of tetrafluoroethylene (TFE) with hexafluoropropylene (HFP) or perfluoro(alkyl vinyl ethers) (PAVE) may be chosen. In all of these fabrics, the outer exposed surface of the fabric has a fluoropolymer coating.

In the use of architectural fabrics, it is frequently necessary to seam sections of the fabric together to provide a covering large enough to enclose an opening in, or in some cases, to cover the entire structure. Butt seams are formed by bringing the edges of two coated fabric pieces together and applying a reinforced tape to the underside of the seam. The reinforcing tape may be heat sealed to the fabric pieces completing the seam. There is always a narrow gap between the edges forming the butt seam, which collects dirt and debris resulting in an aesthetically compromised structure. Lap seams are formed by overlapping two pieces of coated fabric and heat sealing them together. In this case, fabric edges collect dirt and debris. A seam sealant that is easily applied to fill the gaps in butt seams or smooth the edges of lap seams is needed to prevent these areas from collecting dirt and becoming unsightly. For architectural fabrics with a fluoropolymer surface, effective seam-sealants are not presently available because the excellent release properties of the fluoropolymer surface prevent adequate adhesion of known available sealants to the coated fabric. A seam sealant suitable for materials with a fluoropolymer coating on their surface would be useful in other applications as well, such as fluoropolymers sheet materials for conveyor belts or release sheets, especially in the food industry or the precision manufacture of electronic components where debris free environments are important.

BRIEF SUMMARY OF THE INVENTION

The invention provides for a heat sealable tape of a copolymer of tetrafluoroethylene and at least about 15% by weight of a highly fluorinated monomer. The copolymer has a melt viscosity of no greater than about 1000 Pa·S at 372° C. and an application temperature of no greater than about 250° C.

The invention further provides for a seam formed from two sections of sheet material wherein each sheet has at least one fluoropolymer surface. The sections are sealed one to the other by application of heat sealable composition over one fluoropolymer surface of each section. The heat sealable composition comprises a copolymer of tetrafluoroethylene and at least about 15% by weight of a highly fluorinated monomer, the copolymer having a melt viscosity of no greater than about 1000 Pa·S at 372° C. and an application temperature of no greater than about 250° C. In preferred embodiments, building structures and manufacturing equipment are fabricated from sheet material having the seam formed from two sections of sheet material wherein each sheet has at least one fluoropolymer surface.

The invention also provides for a process for sealing a seam between two sections of sheet material wherein each section has at least one fluoropolymer surface. The process includes forming a band of heat sealable composition of a copolymer of tetrafluoroethylene and at least about 15% by weight of a highly fluorinated monomer, wherein the copolymer has a melt viscosity of no greater than about 1000 Pa·S at 372° C. and an application temperature of no greater than about 250° C. The band is positioned over the seam between the two sections of sheet material such that the heat sealable composition contacts one fluoropolymer surface of each section. The band is heated to a temperature below 250° C. sufficient to seal the seam and the heat sealable composition is allowed to cool.

DETAILED DESCRIPTION OF THE INVENTION

The heat sealable tape in accordance with one form of this invention provides a low melting heat sealable fluoropolymer composition that may be heat sealed to seamed fluoropolymer coated sheets or fabrics. In accordance with the process of the invention, the heat sealable composition is applied at temperatures low enough to avoid deforming or weakening the heat sealed seams yet bonds well to the fluoropolymer surface. As will be illustrated in the Examples which follow, the lowest temperature at which the heat sealable composition will suitably adhere and seal to sheet material having a fluoropolymer surface, i.e., the application temperature, is no greater than about 250° C. The fluoropolymer composition may be partially crystalline or amorphous. It may be pigmented to color match the fabric.

Further the chemical and resistance properties of fluoropolymer material provides a seam in accordance with the invention that is debris resistant and which can maintain an attractive appearance even after years of exposure to the weather.

Fluoropolymer Sealant

The heat sealable tape of the invention comprises a heat sealable composition of a copolymer of tetrafluoroethylene (TFE) and at least about 15% by weight of a highly fluorinated monomer, and preferably at least about 20% by weight. The copolymer has a melt viscosity of no greater than about 1000 Pa·S at 372° C., preferably no greater than about 500 Pa·S, most preferably no greater than about 200 Pa·sec, and an application temperature of no greater than about 250° C., preferably no greater than about 200° C.

For the purposes of the present invention, "highly fluorinated" means that 50% or greater of the atoms bonded to carbon are fluorine excluding linking atoms such as O or S. Preferred highly fluorinated monomers useful for this invention include fluoroolefins such as those having 2-10 carbon atoms. Preferred monomers also include fluorinated vinyl ethers such as those having the formula $CY_2=CYOR$ or $CY_2=CYOR'OR$ wherein Y is H or F, and —R and —R' are independently completely-fluorinated or partially-fluorinated alkyl or alkylene groups containing 1-8 carbon atoms and are preferably perfluorinated. Preferred —R groups contain 1-4 carbon atoms and are preferably perfluorinated. Preferred —R'— groups contain 2-4 carbon atoms and are preferably perfluorinated. The most preferred fluorinated monomers for use in the present invention include trifluoroethylene, hexafluoropropylene (HFP), chlorotrifluoroethylene (CTFE), perfluorobutyl ethylene (PFBE), and perfluoro(alkyl vinyl ether) (PAVE), especially perfluoro(ethyl vinyl ether)(PEVE) and perfluoro(methyl vinyl ether)(PMVE).

Especially preferred compositions for use in this invention are a TFE/PEVE dipolymer and a TFE/PEVE/PMVE terpolymer.

The quantity of highly fluorinated comonomer in the copolymer is at least about 15% by weight. Sufficient highly fluorinated comonomer must be used for the application temperature to be no greater than about 250° C. and the amount of comonomer will vary with the particular comonomer(s) used. Preferably, the copolymer will contain at least about 20% by weight highly fluorinated comonomer.

The TFE copolymers used in this invention, especially TFE/PEVE copolymer, can be made by aqueous dispersion polymerization, preferably in the absence of non-aqueous solvent. Other methods that yield copolymer having generally homogeneous composition can be used.

For aqueous dispersion polymerization, a broad range of temperatures can be used. Because of heat transfer considerations and the use of thermally activated initiators, higher temperatures are advantageous, such as temperatures in the range of about 50°-100° C. Temperature in the range 70°-90° C. is preferred for making the copolymers.

Surfactants generally suitable for use in dispersion polymerization of TFE copolymers can be used. Such surfactants include, for example, ammonium perfluorooctanoate (C-8), ammonium perfluorononanoate (C-9), and the perfluoroalkyl ethane sulfonic acids and salts thereof disclosed in U.S. Pat. No. 4,380,618.

Initiators commonly employed in emulsion polymerization of TFE copolymers are water-soluble free-radical initiators such as ammonium persulfate (APS), potassium persulfate (KPS), or disuccinic acid peroxide, or redox systems such as those based on potassium permanganate. Such initiators can be used in aqueous processes to make the TFE copolymers of this invention. APS and/or KPS is preferred.

Chain transfer agent (CTA) can be used in aqueous polymerization of the TFE copolymers used in this invention. A wide range of compounds can be used as CTA. Such compounds include, for example, hydrogen-containing compounds such as molecular hydrogen, the lower alkanes, and lower alkanes substituted with halogen atoms. The chain transfer activity of such compounds when used in TFE/PEVE polymerization can result in copolymer having —$CF_2H$ end groups which are relatively stable. The CTA can contribute other relatively stable end groups, depending on the identity of the CTA. Preferred CTAs include methane, ethane, and substituted hydrocarbons such as methyl chloride, methylene chloride, chloroform, and carbon tetrachloride. The amount of CTA used to achieve desired molecular weight will depend, for given polymerization conditions, on the amount of initiator used and on the chain transfer efficiency of the chosen CTA. Chain transfer efficiency can vary substantially from compound to compound, and varies with temperature.

The formation of —COOH end groups can be offset by buffering the polymerization with alkaline buffering agent such as ammonium carbonate or ammonia (ammonium hydroxide) to provide more stable end groups, as disclosed by Gresham & Vogelpohl in U.S. Pat. No. 3,635,926.

After the reactor is charged with water, surfactant, CTA (if used) and monomers, heated to the chosen temperature and agitation started, a solution of initiator is added at a prescribed rate to initiate polymerization. Thus the polymerization medium is formed as the polymerization reaction commences. A pressure drop is the usual indicator that polymerization has started. Then, TFE addition is started and controlled according to the scheme chosen to regulate the polymerization. An initiator solution, which can be the same as or different from the first initiator solution, is usually added throughout the reaction.

One skilled in the art will recognize that one or more additional copolymerizable monomers, included those which are not highly fluorinated, can be introduced into the polymerization. For the copolymer to provide the desired chemical and weather resistance, the quantity of comonomers which are not highly fluorinated are appropriately limited. Preferably, TFE and highly fluorinated monomers comprise at least about 90% by weight of the copolymer, more preferably at least about 95% by weight of the copolymer. Most preferably, the copolymer consists essentially of TFE and highly fluorinated monomers, i.e., sufficient quantity of such monomers so that the chemical and weather resistance properties of the copolymer are essentially determined by the TFE and highly fluorinated monomers.

There are several alternatives for regulating the rate of polymerizing the preferred TFE/PEVE copolymers used in this invention. It is common with most alternatives first to precharge at least part of the PEVE monomer and then to add TFE to the desired total pressure. Additional TFE is then added after initiator injection and reaction kickoff to maintain the chosen pressure, and additional PEVE may be added, also. The TFE may be added at a constant rate, with agitator speed changed as necessary to increase or decrease actual polymerization rate and thus to maintain constant total pressure. In a variant of this alternative, pressure may be varied to maintain constant reaction rate at constant TFE feed rate and constant agitator speed. Alternatively, the total pressure and the agitator speed may both be held constant, with TFE added as necessary to maintain the constant pressure. A third alternative is to carry out the polymerization in stages with variable agitator speed, but with steadily increasing TFE feed rates.

When PEVE is added during the reaction, it is convenient to inject it at a fixed rate. Preferably, the rate of PEVE addition is uniform during a given phase of polymerization. However, one skilled in the art will appreciate that a wide variety of PEVE monomer addition programs can be employed. Thus, for example, PEVE can be added as a mixture with TFE, or a series of discrete PEVE additions can be used. Such discrete additions can be in equal or varying amounts, and at equal or varying intervals. Other non-uniform PEVE addition programs can be used.

When highly fluorinated monomers other than TFE and PEVE are used, each other monomer can independently be introduced as described for PEVE, depending on the reactivity of the of the other monomer, the amount to be incorporated into the copolymer, and the result desired. Thus, each other monomer can be precharged and/or added during polymerization, including addition in mixture with PEVE and/or TFE.

Any workable pressure can be used in aqueous processes to make the TFE copolymers used in this invention. High pressure offers an advantage over low pressure in increased reaction rate. However, the polymerization of TFE is highly exothermic, so high reaction rate increases the heat that must be removed or accommodated as temperature increases. Pressures that can be used are also determined by equipment design and by safety concerns in the handling of TFE. Generally, pressures in the range of about 0.3-7 MPa are known for dispersion polymerization of TFE copolymers, and pressures in the range 0.7-3.5 MPa are common. While it is common to maintain constant pressure in the reactor, pressure can be varied.

After dispersion polymerization is complete and raw (as-polymerized) dispersion has been discharged from the reactor, traditional techniques known in the art (see U.S. Pat. No. 5,266,639, for example) can be used to recover TFE copolymer solids from the aqueous polymerization medium. For example, such methods as coagulation by vigorous agitation, optionally with added electrolyte, or by freezing and thawing, followed by separation of the wet solids from the liquid and then by drying can be used.

When made by aqueous dispersion polymerization, the TFE/PEVE copolymers used in this invention can be used in dispersion form. The as-polymerized (raw) dispersion may be used as discharged from the reactor if it has adequate stability and/or wetting characteristics for the intended purpose. Alternatively, the raw dispersion can be adjusted by addition of surfactants, or concentrated and stabilized by techniques well known in the art. Other materials can be blended into the TFE/PEVE copolymer dispersions for use in dispersion form, or such blends can be co-coagulated as a step toward dry blends or filled resins. Small raw dispersion particle size (RDPS) typically obtained, e.g., 50-250 nm, contributes to stability with respect to settling and may make the dispersions particularly desirable for certain uses, such as the formation of coherent films.

Dispersion concentrations can vary over a broad range, such as from about 10-40 weight % solids as obtained from polymerization to about 70 weight % solids when concentrated, based on combined weight of polymer solids and aqueous medium.

The amorphous TFE/PEVE copolymers used in this invention can be in solution in fluorinated solvents. Illustrative solvents are disclosed, for example, by Tuminello & Cavanaugh in U.S. Pat. No. 5,328,946 and by Morgan et al. in U.S. Pat. No. 5,397,829. Other solvents that can be used include fluorinated trialkyl amines such as perfluoro(dibutylmethyl)amine and perfluoro(triamyl)amine. Perfluorinated compounds are preferred as solvents, but fluorinated compounds having up to about 12.5 atomic percent (at %) hydrogen and/or about 37.5 at % chlorine, based on total atoms bonded to carbon atoms, can be used. Generally, at least 50% of total atoms bonded to carbon atoms will be fluorine atoms. The concentration of polymer in the solutions of this invention can be at least 0.1 wt % and as much as 10 wt % and higher, 20 wt % and 30 wt %, depending on polymer and solvent, based on combined weight of polymer and solvent. Since solution viscosity increases with polymer concentration, lower concentrations, such as 0.5-5 wt %, are preferred for many purposes.

Dispersions and solutions of the TFE copolymer heat sealable composition described above can be applied by conventional techniques including casting, dipping, painting and spraying. Normally, the dispersion or solution is deposited in place in the wet state, the deposit is dried, and the dried resin is fused or consolidated thermally. For convenient storage and subsequent use in extrusion processes mentioned hereinafter, the dried resin is often fused, extruded and cut into pellets or beads.

The heat sealable tape is in one embodiment, a self-supporting film formed from the dried fused resin. By self-supporting it is meant, that a polymer film or sheet has self integrity and is formed either without the use of a support or can be removed from a support as a self-supporting film. In a preferred embodiment, the heat sealable tape comprises the heat sealable TFE copolymer composition and a carrier sheet. To manufacture heat sealable tape, the heat sealable TFE copolymer composition can be applied by casting from solution or dispersion onto a support and a film results upon drying and/or fusing. In the preferred embodiment in which the tape further comprises a carrier sheet, the film can be cast directly onto the carrier sheet of which may be a polyester film, silicone paper, or polyimide film. Tapes made by casting are advantageously manufactured by casting in wide widths and slitting the film (and carrier sheet if used) into narrow widths to form the tape.

Alternatively, starting with the copolymer resin in pellet or bead form, the fluoropolymer can be extruded as a melt to form a tape. When a carrier film is used, preferably the copolymer is melt extruded directly onto the carrier film. With or without a carrier sheet, it may be desirable to extrude a wide width film and slit the film (and carrier sheet if present) into the desired narrower width tape.

In an especially preferred embodiment, the heat sealable tape is in the form of a continuous roll of the heat sealable TFE copolymer composition and carrier sheet. The heat sealable tape is then in suitable form for easy field application for sealing seams at construction sites using architectural fabrics. The heat sealable tape preferably has a thickness of from about 25 μm to about 500 μm and a width of from about 6 mm to about 30 cm.

Application

The invention further provides for a seam formed from two sections of sheet material wherein each sheet has at least one fluoropolymer surface using the heat sealable TFE copolymer composition described above and a process for sealing a seam.

The seam of this invention is formed from two sections of sheet material, each sheet having at least one fluoropolymer surface. The sections are sealed one to the other by application of heat sealable composition over one fluoropolymer surface of each section. The heat sealable composition comprises a copolymer of tetrafluoroethylene and at least about 15%, preferably least about 20%, by weight of a highly fluorinated monomer as described above. The copolymer has a melt viscosity of no greater than about 1000 Pa·S at 372° C., preferably no greater than about 500 Pa·S at 372° C., most preferably no greater than about 200 Pa·S at 372° C. and an application temperature of no greater than about 250° C., preferably no greater than about 200° C. In a preferred embodiment, at least one of the sheets is a self-supporting fluoropolymer film. In a more preferred embodiment at least one of the sheets is a fabric having at least one fluoropolymer surface. The surface on the fabric can be formed by applying a self-supporting fluoropolymer film to the fabric or by coating or impregnating the fabric with a fluoropolymer composition. In the preferred embodiment where the seam is constructed from a fabric having a fluoropolymer surface, the fabric can be woven or nonwoven. The seam formed in this invention may be any of a number of common seam constructions such as two sections of sheet material formed into a butt seam or a lap seam, the sections being sealed one to the other by application of the heat sealable composition used in this invention.

Butt seams are formed by bringing together the edges of two fluoropolymer coated sections of sheet material and applying a reinforcing tape to the underside of the seam. In order to eliminate the narrow gap formed on the side opposite to the reinforcing tape, a heat sealable TFE copolymer composition as described above is used to seal the gap. The fluoropolymer sealant prevents the collection of dirt and debris between the edges forming the butt seam. Lap seams are formed by overlapping two pieces of fluoropolymer coated sheet material, especially fabric, and heat sealing them together leaving edges which can collect dirt and debris. A heat sealable TFE copolymer composition is applied over the edges of the lap seam to prevent the edges from collecting dirt and becoming unsightly. While the heat sealable composition used in accordance with the invention adheres well to the fluoropolymer surface, it is not typically used as the adhesive for providing structural strength to the seams of architectural fabrics.

The process of this invention is a method for sealing a seam between two sections of sheet material wherein each section has at least one fluoropolymer surface. The process includes forming a band of heat sealable composition of a copolymer of tetrafluoroethylene and at least about 15% by weight, preferably at least about 20% by weight, of a highly fluorinated monomer as described above. The copolymer has a melt viscosity of no greater than about 1000 Pa·S, preferably no greater than about 500 Pa·S, at 372° C. most preferably no greater than about 200 Pa·S at 372° C. and an application temperature of no greater than about 250° C., preferably no greater than about 200° C. The band is positioned over the seam between the two sections of sheet material such that the heat sealable composition contacts one fluoropolymer surface of each section. The band is heated to a temperature below 250° C. sufficient to seal the seam and the heat sealable composition is allowed to cool. The invention includes the application of a band of heat sealable composition as tape as has been described or as a band of extruded material in a molten state.

In a preferred embodiment, the band is formed by applying the heat sealable composition onto a carrier sheet to form a heat sealable tape. The band can be formed on the carrier by deposition from dispersion or solution of the heat sealable composition with subsequent drying and thermal consolidation or by extrusion of the heat sealable composition onto the carrier. For application, the band is applied over the seam with the heat sealable composition contacting one fluoropolymer surface of each section of sheet. In a more preferred embodiment, the sealing process includes heating the tape with the carrier film in place by applying heat to the side of the tape having the carrier sheet. The heating may be done with a heating element, preferably one that is portable so that application can occur easily in the field at construction sites. In an especially preferred embodiment, pressure and heat are applied. Pressure of preferably no greater than 5 psi is sufficient to cause the sealing. In the most preferred embodiment, the carrier sheet is removed after allowing the heat sealable composition to cool.

Use

Tapes and seams of this invention are especially useful in piecing together sections of sheets, especially fabrics, for large architectural structures. The invention is applicable to such building structures which use architectural sheet material comprised of a reinforcing fabric for strength and a fluoropolymer surface for weather and dirt resistance. Such building structures include side panels, roofs, tents, awnings, canopies, domes and the like. The structures may be air supported or tension supported as is known in the art. Fabrics with seams of this invention have use in many large public facilities such as department stores, sports arenas, schools, office buildings, airport terminals, zoological exhibit areas and large areas used for religious congregation.

The reinforcing fabric may be made from a variety of materials such as cotton, nylon, polyester, polyolefin or glass, or blends of such fibers. The fabric may be woven as commonly done with cotton, nylon or glass, or it may be nonwoven as with fabrics sold under the trademarks TYVEK®, TYPAR® and REEMAY®.

Preferred fluoropolymer surfaces include polyvinyl fluoride and perfluorinated resins such as polytetrafluoroethylene or copolymers of tetrafluoroethylene with hexafluoropropylene or perfluoroalkylvinyl ethers. The fluoropolymer surface may be translucent or pigmented. The fluoropolymer preferably contains one or more light stabilizers as additives which when assembled into the architectural structures, protect the structure, by reducing the damage caused by exposure to sun. Light stabilizer additives include compounds that absorb ultraviolet radiation such as hydroxybenzophenones and hydroxybenzotriazoles. Other possible light stabilizer additives include hindered amines light stabilizers (HALS) and antioxidants.

Buildings formed with the heat sealable tapes and seams of this invention are resistant to the accumulation of dirt and debris conferring improved aesthetics and a longer life span to the structure. Such building structures are a preferred embodiment of the invention.

Tapes and seams of this invention are also useful for piecing together fluoropolymer coated sheets, especially fabrics, used in manufacturing equipment. In the precision manufacture of electronic components, conveyor belts that are seamed together and sealed with the heat sealable TFE copolymer composition used in this invention have the ability to resist the collection of foreign materials which interfere in the precision and reliability of the manufactured components. The release capability of the seams and tapes of this invention also find use in seam formation of large release sheets used in the food industry. A common example are the release sheets used in the commercial cooking of hamburger patties in a two-sided grill. In order to insure easy release of the cooked patty without tearing the finished product, the upper metal platen of the grill is provided with a nonstick surface layer. Such a replaceable nonstick surface layer of polytetrafluoroethylene-impregnated glass fiber cloth is described in U.S. Pat. No. 4,729,296. A specific embodiment of this invention includes manufacturing equipment fabricated from tapes and seams of this invention, whether such equipment is used in the preparation of food products, manufacture of electronic components or other products where debris free environments are desired.

TEST METHODS

Composition

Fluoropolymer compositions are determined either using high temperature $^{19}$F NMR spectroscopy or using Fourier transform infrared (FTIR) spectroscopy on 0.095-0.105 mm thick films pressed at 350° C. When using FTIR, a series of polymer films are used to calibrate the FTIR method by plotting the intensity of a band specific for the comonomer divided by intensity of the thickness band at 4.25 μm against the composition determined by $^{19}$F NMR. The data are fit to a straight line which is used to calculate compositions of unknown samples by measuring the intensity ratios for the comonomer bands and the thickness band. The comonomer bands used in the analysis in the Examples which follow are: PEVE 9.17 μm, PMVE 11.2 μm and HFP 10.2 μm.

Melt Viscosity

Melt viscosities of the fluoropolymers are determined by ASTM method D1238-52T modified as described in U.S. Pat. No. 4,380,618.

Thermal Characteristics

Thermal characteristics of tetrafluoroethylene copolymer resins are determined by Differential Scanning Calorimetry (DSC) by the method of ASTM D-4591-87. The peak temperature of the melting endotherm is determined on first melting.

Application Temperature

Application Temperature of tetrafluoroethylene copolymer resins, the lowest temperature at which the heat sealable composition will suitably adhere and seal to sheet material having a fluoropolymer surface, can be determined by applying a strip of the copolymer over a seam between PTFE films at a variety of temperatures slightly below to 50° C. above the peak temperature of the melting endotherm on first melting. Procedures described in Comparative Example B below are used except for the variety of temperatures described above is used for the hydraulic press. The lowest temperature at which the seam remains intact after boiling the sample in water for 3 days is the Application Temperature.

EXAMPLES

Comparative Example A

This comparative example illustrates the polymerization of TFE copolymer with a small amount of PEVE resulting in a polymer with a high melting point. A stirred jacketed stainless steel horizontal autoclave of 11.4 L (3 U.S. gal) capacity is used as the polymerization vessel with a two blade cage-type agitator run at 65 rpm. The autoclave is equipped with instrumentation to measure temperature and pressure and with a compressor that could feed monomer to the autoclave at the desired pressure. The autoclave is filled 6.2 L of deionized water containing 12 g of ammonium perfluorooctanoate (3M Co., St. Paul, Minn.). The autoclave is then pressured to 2.8 MPa (400 psig) with nitrogen and vented three times followed by similar pressuring and venting with TFE. The autoclave contents are heated to 90° C. and 406.6 g TFE and 306.8 g perfluoro(ethyl vinyl ether) (PEVE) are added to bring the vessel to its working pressure of 2.8 M Pa (400 psig). Initiator solution is prepared by dissolving 5 g ammonium persulfate in 1 L of deionized water. The initiator solution is fed to-the reactor at a rate of 25 mL/min for a period of five minutes, then the rate is reduced and maintained at 1 mL/min for the duration of the experiment. The autoclave is operated in a semibatch fashion in which a monomer mixture in weight ratio 85/15 TFE/PEVE is added to the reactor to maintain constant pressure as polymerization occurred. A total of 1700.8 g TFE and 300.0 g PEVE is added during the run. After about 1½ hrs. the feed is stopped, the contents of the autoclave are cooled, and excess monomers are vented. The polymer dispersion is discharged to a receiver as a turbid homogeneous mixture containing 23.1 wt. % solid. Polymer is isolated freezing the dispersion then collecting the product on a suction filter. The filter cake is washed with water and dried in a convection over at 90-100° C. to yield 1973 g copolymer containing 88.0 wt % TFE and 12 wt % PEVE. The DSC of the polymer displays a melting endotherm with a peak temperature of 277° C. Melt viscosity as determined at 372° C. is 410 Pa·sec.

Example 1

This example illustrates the preparation of a TFE/PEVE copolymer heat sealing composition with a sufficiently low melting temperature. The procedure of Comparative Example A is repeated except the monomer precharge is 302.1 g TFE and 628.5 g PEVE. Copolymer dispersion of 25.2% solids is obtained which yields 2261 g of polymer containing 71.1 wt % TFE and 28.9 wt % PEVE after drying. The DSC of the polymer displays a melting endotherm with a peak temperature of 198° C. Melt viscosity as determined at 372° C. is 86 Pa·sec.

Comparative Example B

This comparative example illustrates that a high melting copolymer of TFE/PEVE requires a high application temperature in order for the sealant to achieve a stable bond. A PTFE film is made by draw down of dispersion on a temperature resistant glass plate (8 in by 12 in) using a 12-inch long Meyer rod (No. 12). A small quantity of dispersion (Sold by DuPont as PTFE Aqueous Dispersion 30B at 60% by weight solids) is placed on the glass plate by means of a disposable pipette. The Meyer rod is held in a level position over the plate in contact with the dispersion and the plate and is drawn by an even steady motion to coat the whole glass plate. The plate is placed in a ventilated convection oven for 30 minutes at 100° C. followed by 10 minutes in a second convection oven at 380° C. The film is then peeled off after the plate had cooled down to the room temperature using a razor knife. The film is 15 μm thick (0.6 mil). Two pieces about 2.5 cm×5 cm (1"×2") are cut from the film and placed side by side on a larger square of KAPTON® polyimide film so that a 5 cm edge from each piece is just touching. This forms a butt seam. A film about 50 μm thick (2 mil) is pressed from the TFE/PEVE copolymer prepared in Comparative Example A. A strip of the TFE/PEVE film about 0.6 cm×5 cm (¼"×2") is cut and placed over the butt seam and the assembly was covered with another square of KAPTON® polyimide film. This is then placed between two 0.3 cm thick (⅛") steel plates and inserted into a hydraulic press heated to 270° C. The jaws of the press are closed so that they just touch the steel plates. The sample is allowed to heat for 2 minutes and remain in the press at temperature for another minute. The hot assembly is removed from the press. The KAPTON® film and fluoropolymer sandwich is removed from the plates and cooled on a stone bench top to ambient temperature. The KAPTON® film is removed to yield the PTFE film pieces securely bonded to one another. The seam remained intact after boiling the sample in water for 3 days.

The above procedure is repeated except that the press was heated to 250° C. In this case, the bond is less secure since the PTFE film could be peeled from the TFE/PEVE heat sealable composition without tearing. The result shows that it is important to heat the sealant composition above its application temperature to produce a strong bond. However, heating a composition at too high a temperature, namely above 250° C. may deform or weaken heat sealed seams, particularly in constructions which employ resins other than fluoropolymers. Accordingly, heat sealable compositions with application temperatures of no greater than about 250° C. are used in the practice of the present invention.

Example 2

This example illustrates that a low melting copolymer of TFE/PEVE copolymer heat sealable composition forms a strong bond with a fluoropolymer surface using a low application temperature, i.e., temperatures at 250° C. or below. The procedure of Comparative Example B is followed except a film pressed from the TFE/PEVE copolymer prepared in Example 1 is used and the press is heated to 250° C. After removal of the KAPTON® film a secure bond by the heat sealable composition to the PTFE is found and the bond survives exposure to boiling water for 3 days with no apparent effect.

The example is repeated except that the press is heated to 230° C. to effect the bond. Substantially the same results are obtained as when the bond is formed at 250° C.

Example 3

This example illustrates the use of a heat sealable TFE/PEVE copolymer on sections of sheet material composed of PTFE impregnated glass fabric. Woven glass fabric style 1080 is coated on both sides in one pass with PTFE Aqueous Dispersion 30B at 60% by weight solids (DuPont). This fabric is available from JPS Glass and Industrial Fabrics (Greenville, S.C.) and weighs 1.4 oz/yd². It is specified according to the following:

| | |
|---|---|
| Warp Yarn: | ECD 450 1/0 |
| Fill Yarn: | ECD 450 1/0 |
| e/in: | 60 |
| p/in: | 47 |
| Thickness: | 0.0023 in |
| Break Strength: | Warp = 80 lbs/in Fill = 50 lbs/in |

A coating line equipped with unwind station, dip tank, guide rollers, smooth wiper bars, a two-zone oven and wind up is used to put one pass of PTFE dispersion on the glass fabric. First oven zone is set at 250° F. and second zone at 750° F. The line speed is 4 ft/min. The coated cloth is about 100 μm thick (4 mil).

Two pieces of the PTFE coated fabric about 2.5 cm×5 cm (1"×2") are cut from the coated cloth and placed side by side on a strip of KAPTON® tape so that a 5 cm edge from each piece is just touching. This formed a butt seam. The tape is used to prevent the individual glass cloth pieces from shifting while they are being handled and the experiment is in progress. (The reinforcing fabric normally used in forming a butt seam is not used so that the seam sealing properties of copolymer can be better evaluated.)

A film about 100 μm (4 mil) thick is pressed from the TFE/PEVE copolymer prepared in Example 1. A strip of the TFE/PEVE film about 0.6 cm×5 cm (¼"×2") is cut and placed over the butt seam. The assembly is covered with a square of silicone coated release paper, grade 50S2L11, available from Eastern Paper, Brewer, Me. This is then placed between two 0.3 cm thick (⅛") steel plates and inserted into a hydraulic press heated to 250° C. The jaws of the press are closed so that they just touch the steel plates. The sample is allowed to heat for 2 minutes and remain in the press at temperature for another minute. The hot assembly is removed from the press. The KAPTON® film, fluoropolymer sample and release paper are removed from the plates and cooled on a stone bench top to ambient temperature. The KAPTON® film and release paper are removed to yield the PTFE coated glass cloth pieces securely bonded to one another. The heat sealable composition fills the narrow gap between the two pieces of glass cloth to yield a smooth surface that could not trap dirt or debris. The seam remains intact even after boiling the sample in water for 3 days or after freezing the sample in dry ice.

The above procedure is repeated except that the press is heated to 230° C. Substantially the same results are obtained. (In this example, the PTFE glass fabric is not prone to damage by heating to this temperature although fabrics containing other resins could be damaged.)

Example 4

This example illustrates the use of heat sealable TFE/HFP copolymer on sections of sheet material composed of PTFE impregnated glass fabric. A TFE/HFP copolymer identified as TE-5038A manufactured by the DuPont Co., Wilmington, Del., containing 75.7 wt % TFE and 24.3 wt % HFP displays a melting endotherm with a peak temperature of 175° C. and a melt viscosity at 372° C. of 82 Pa·sec (mfr 650). The copolymer is pressed into a film about 200 mm (8 mil) thick is pressed at 200° C. and cooled to room temperature. A strip 0.64 cm (¼") wide is cut from the film and bonded to the coated glass fabric as described in Example 3. (Again, the reinforcing fabric normally used in forming a butt seams is not used so that the seam sealing properties of copolymer can be better evaluated.) The bonded sample is then boiled in water for 3 days and then frozen in dry ice for several hours. The sample is brought to room temperature and examined. The heat sealable composition remains bonded to the coated cloth and does not delaminate after flexing showing the heat sealable composition is well bonded to the coated cloth.

Example 5

This example illustrates the use of amorphous heat sealable TFE terpolymer on sections of sheet material composed of PTFE impregnated glass fabric. (Again, the reinforcing fabric normally used in forming a butt seams is not used so that the seam sealing properties of copolymer can be better evaluated.) The procedure of Example 4 is followed except that an amorphous TFE/perfluoroalkyl ether terpolymer containing PEVE and PMVE containing 62.1 wt % TFE, 24.8 wt % PMVE, and 13.1 wt % PEVE which has melt viscosity at 372° C. of 350 Pa·sec (mfr 150) known as TE-5154A, manufactured by the DuPont Co, Wilmington, Del., is substituted for the TFE/HFP copolymer. The heat sealable composition survives the boiling and freezing treatment as in Example 4 and remains bonded to the coated glass cloth after flexing at room temperature.

What is claimed is:

1. A heat sealable tape comprising a copolymer of tetrafluoroethylene and at least about 15% by weight of a highly fluorinated monomer, said copolymer having a melt viscosity of no greater than about 1000 Pa·S at 372° C. and an application temperature of no greater than about 250° C.

2. The heat sealable tape of claim 1 wherein the melt viscosity is no greater than about 500 Pa·S.

3. The heat sealable tape of claim 1 wherein the melt viscosity is no greater than about 200 Pa·S.

4. The heat sealable tape of claim 1 wherein said highly fluorinated monomer comprises at least about 20% by weight of said copolymer.

5. The heat sealable tape of claim 1 wherein said highly fluorinated monomer is selected from the group consisting of trifluoroethylene, hexafluoropropylene, monochlorotrifluoroethylene, perfluorobutyl ethylene, and perfluoro(alkyl vinyl ether).

6. The heat sealable tape of claim 1 wherein said highly fluorinated monomer is perfluoro(ethyl vinyl ether).

7. The heat sealable tape of claim 1 further comprising a carrier sheet.

8. A continuous roll of said heat sealable tape of claim 6.

9. The heat sealable tape of claim 1 wherein the tape has a thickness of from about 25 μm to about 500 μm.

10. The heat sealable tape of claim 1 wherein the tape has a width of from about 6 mm to about 30 cm.

* * * * *